US011488093B1

(12) United States Patent
Felix et al.

(10) Patent No.: US 11,488,093 B1
(45) Date of Patent: Nov. 1, 2022

(54) MULTI-LEG INTERNATIONAL SHIPPING

(71) Applicant: PSI Systems, Inc., Mountain View, CA (US)

(72) Inventors: Shea Robert Felix, Falls Church, VA (US); Julian Thomas, Orinda, CA (US); John Roland Clem, Manhattan Beach, CA (US); Dhara Christina Sheila Hara, Sunnyvale, CA (US)

(73) Assignee: PSI Systems, Inc., Mountain View, CA (US)

( * ) Notice: Subject to any disclaimer, the term of this patent is extended or adjusted under 35 U.S.C. 154(b) by 1072 days.

(21) Appl. No.: 15/187,401

(22) Filed: Jun. 20, 2016

(51) Int. Cl.
*G06Q 10/08* (2012.01)

(52) U.S. Cl.
CPC ..... *G06Q 10/0831* (2013.01); *G06Q 10/0838* (2013.01); *G06Q 10/08345* (2013.01)

(58) Field of Classification Search
CPC ................................................ G06Q 10/0831
See application file for complete search history.

(56) References Cited

U.S. PATENT DOCUMENTS

| | | | |
|---|---|---|---|
| 5,319,562 | A | 6/1994 | Whitehouse |
| 6,005,945 | A | 12/1999 | Whitehouse |
| 10,181,110 | B1 | 1/2019 | Atkinson et al. |
| 2002/0120475 | A1 | 8/2002 | Morimoto |
| 2004/0034544 | A1* | 2/2004 | Fields ..................... G06Q 10/08 705/334 |
| 2007/0299686 | A1* | 12/2007 | Hu ........................ G06Q 20/20 705/407 |
| 2011/0066549 | A1 | 3/2011 | Whitehouse |
| 2013/0198060 | A1 | 8/2013 | Whitehouse |
| 2015/0166163 | A1* | 6/2015 | Longson .................. B63J 99/00 340/984 |

(Continued)

OTHER PUBLICATIONS

Abramowicz, Towards a Service-Based Internet 4th European Conference, ServiceWave 2011, Poznan, Poland, Oct. 26-28, 2011, Proceedings, Springer (Year: 2011).*

*Primary Examiner* — Resha Desai
*Assistant Examiner* — Ismail A Manejwala
(74) *Attorney, Agent, or Firm* — Norton Rose Fulbright US LLP

(57) ABSTRACT

Systems and methods which invoke multiple shipment legs to provide an international shipment architecture adapted for efficient and reliable international shipping of items and facilitating configuration of aspects of one or more of the multiple shipment legs for particular shipments, shippers, recipients, origination countries, and/or destination countries are described. According to embodiments, an item is transported from a shipper to an international processing provider or other origination country egress processing point in an ingestion leg of an international shipment. The item is provided international processing and international border passage by the international processing provider in a bridge leg of the international shipment. In delivery leg of the international shipment, the item is transported from the international processing provider or other ingress processing point in the destination country to the recipient. Embodiments utilize multiple shipping labels and/or a unified tracking number for an item shipped in a multiple leg international shipment.

33 Claims, 2 Drawing Sheets

(56) References Cited

U.S. PATENT DOCUMENTS

2016/0098677 A1* 4/2016 Kim .............. G06Q 10/08355
  705/333
2016/0239788 A1 8/2016 Hanks
2017/0091320 A1* 3/2017 Psota .............. G06F 16/313

* cited by examiner

MULTI-LEG INTERNATIONAL SHIPPING

TECHNICAL FIELD

The invention relates generally to shipment of items and, more particularly, to international shipment of items using multiple shipment legs.

BACKGROUND OF THE INVENTION

The shipment of items, such as new and used goods shipped from merchants or other shippers to purchasers or other recipients, has been commonplace for years. For example, it is commonplace for various merchants, whether they be "brick and mortar" merchants, online merchants, or sellers through an electronic marketplace (e.g., eBay, Amazon Marketplace, Shopify, etc.), to ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers.

With the advent of the Internet and the advent of innumerable e-commerce merchants and marketplaces, not only have the number of items shipped increased appreciably in recent years, but so too have the number of shippers and recipients of such items. Moreover, even small sellers and individuals are provided with a global market, thus resulting in an ever increasing number of items being shipped internationally. Accordingly, more and more shippers, including not only large scale business traditionally involved with high volume shipping but also less sophisticated smaller entities, are shipping items internationally.

International shipping can, however be problematic for the shipper and/or recipient and can present challenges often not an issue with respect to domestic shipping. For example, generally there are duties imposed on and customs processing of items entering from another country. Clearing the customs process in a destination country can often require significant time for particular items or shipments, and in many cases can result in the item being refused entry into the country. Moreover, the determination of duties and taxes for any particular destination country can be challenging, particularly in light of the large number of duty codes or categories used by many countries and the taxes often being based on the particular locality of the destination (i.e., the city or region in which the destination is located, not just the destination country). Theft, loss, and abandonment of shipped items is a substantial risk when shipped items are carried by some shipping service providers operating within particular countries.

Often a shipper, particularly a shipper occasionally using international shipping services, does not have sufficient knowledge to confidently complete customs forms (e.g., to properly determine a goods code or category) or to determine if duties or taxes are to be paid and, if so, the amount of such duties and taxes. Moreover, shippers (even relatively sophisticated shippers) often do not have information from which to determine the reliability or veracity of any particular shipping service provider operating in a foreign jurisdiction, and even if the shipper had such information the shipper is often limited in their ability to avoid using such a shipping service provider. For example, a shipper may utilize a domestic postal service (e.g., the United States Postal Service (USPS)) for international shipping, such as due to cost and/or availability. The domestic postal service may utilize a particular shipping service provider in the destination country (e.g., the domestic postal service of the destination country) without any choice to the shipper, and wherein the destination country shipping service provider is not wholly reliable or experiences a high loss or theft rate. Moreover, such international shipping services are generally not well suited for efficient customs processing, often leading to relatively lengthy times to clear customs as well as a significant refusal rate with respect to goods entering some countries. Accordingly, the international shipping process can be frustrating to shippers and create surprises for both the shipper and recipient in terms of the reliability of delivery of items, the ultimate total cost of goods delivered to the recipient, and the time required for delivery of goods to the recipient.

BRIEF SUMMARY OF THE INVENTION

The present invention is directed to systems and methods which invoke multiple shipment legs to provide a robust international shipment architecture adapted for efficient and reliable international shipping of items and facilitating configuration of aspects of one or more of the multiple shipment legs for particular shipments, shippers, recipients, origination countries, and/or destination countries. Embodiments may, for example, provide for an ingestion leg, a bridge leg, and a delivery leg for international shipments. In operation according to embodiments, an item to be shipped is transported from a shipper to an international processing provider or other origination country egress processing point in an ingestion leg of an international shipment. Thereafter, the item is provided international processing (e.g., customs processing, duty and/or tax settlement, etc.) and international border passage (e.g., international transportation, customs logistics, etc.) by the international processing provider in a bridge leg of the international shipment. In delivery leg of the international shipment, the item is transported from the international processing provider or other ingress processing point in the destination country to the recipient.

In operation of a multiple leg international shipment of embodiments, the particular shipping service providers providing the ingestion leg and delivery leg shipping services may each be individually selected, such as for the individual international shipment to provide lowest or most desired rates, to provide one or more special services or handling, to facilitate a desired delivery timeline, to meet a desired or threshold level of reliability or veracity with respect to the particular services, etc. Embodiments may, for example, utilize domestic shipping services of one or more shipping service providers (e.g., a domestic postal service, such as USPS, a local courier service, a domestic (or domestic branch of) parcel service, a less than a truckload (LTL) service, etc.) within an origination country for an ingestion leg and within a destination country for a delivery leg of an international shipment. A particular shipping service provider and/or the particular shipping service to be provided by the shipping service provider may be selected for meeting one or more needs or desires with respect to the individual international shipment.

In addition to or in the alternative to the particular shipping service providers providing the ingestion leg and delivery leg shipping services being individually selected, embodiments of a multiple leg international shipment herein may operate to select a particular international processing provider and/or particular international processing provider facility for use with respect to individual international shipments. For example, a particular international processing provider may be selected for the international shipment of an item based upon their serving the destination country, providing customs clearance processing or other international processing services with respect to particular type of goods included in the shipped item, providing selected or desired services (e.g., delivered duties paid (DDP) service, expedited international processing services, etc.), one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), and/or the like. Additionally or alternatively, a particular international processing provider facility may be selected for the international shipment of an item based upon the facility's proximity to the shipper, the recipient, the origination country, and/or the destination country, the facility's capability for handling a particular type of goods included in the shipped item, and/or the like. An item shipped in accordance with a multiple leg international shipment of embodiments may thus be routed to a particular international processing provider facility location corresponding to a selected international processing provider and/or international processing provider facility.

In facilitating the use of individually selected shipping service providers for various legs of an international shipment architecture, individually selected international processing provider, and/or individually selected international processing provider facility, embodiments utilize multiple shipping labels for a shipped item. For example, a first shipping label may be utilized for the ingestion leg to route the item from the shipper to the international processing provider or other origination country egress processing point and a second shipping label may be utilized for the delivery leg to route the item from the international processing provider or other ingress point in the destination country to the recipient. Yet another shipping label may be utilized in the bridge leg to route the item for international border passage. For example, a shipping label may be utilized with respect to a plurality of international shipment items (e.g., as may be aggregated in a bag, box, or other container by the international processing provider) for transport between the origination country and destination country. The appropriate shipping label for the selected shipping service provider, shipping service, shipping route, etc. may be generated and/or printed for use in the corresponding leg of the multiple leg international shipment.

Embodiments utilizing domestic shipping services with respect to the ingestion leg and/or the delivery leg and the aforementioned multiple shipping labels utilize a domestic shipping label configuration for the item with respect to the domestic shipping service, whereby the domestic shipping label does not include international shipment information (e.g., package contents information, customs information, declared value information, international destination information, and/or the like). For example, where a domestic shipping service is utilized in the destination country for the delivery leg, the shipping label present on the item for that leg of the multiple leg international shipment may comprise recipient address information and domestic address information (e.g., international processing provider or other ingress processing point address, domestic return agent address, etc.) for a return shipping address, without international customs information. Accordingly, where package theft may be a concern, items shipped using a multiple leg international shipment in accordance to the concepts herein may have information regarding it being an international shipment and information disclosing the contents or value of the item obfuscated.

Although customs information or other international shipment information may not be included on one or more label utilized for a particular leg of a multiple leg international shipment, embodiments nevertheless operate to collect such information and provide for customs clearance and other international processing for the item. For example, embodiments may operate to include a shipping label with respect to the shipped item or a plurality of international shipment items for transport between the origination country and destination country that includes customs information and/or other international shipment information to facilitate appropriate international processing of the item(s). Additionally or alternatively, international processing information, such as customs, duty, and/or tax information, is provided in a destination country prior to the arrival of items shipped internationally in a multiple leg international shipment of embodiments herein. For example, such international processing information may be transmitted electronically to the international processing provider or other ingress processing point in the destination country for initiation of international processing of the shipment prior to arrival of the corresponding item(s) in the destination country, such as to expedite international shipment processing when the item arrives in the destination or to otherwise reduce the timeline for ultimate delivery of the item to the recipient.

Moreover, international processing of the item may be performed by the international processing provider of embodiments prior to the item leaving the origination country (or otherwise prior to the item entering the destination country), such as at the international processing provider facility or other origination country egress processing point in the origination country. For example, items may be inspected for proper customs goods code or category assignment, conformance to importation restrictions of the destination country, duty and/or tax settlement, etc. to facilitate expedited international shipment processing in the destination country and/or to avoid situations in which an item is refused in the destination country and must be returned to the origination country.

International shipment processing of the item performed by the international processing provider of embodiments may comprise aggregating a plurality of items from individual international shipments (e.g., in a bag, box, or other container). Such aggregation may not only be used for convenient transport of the items between the origination country and destination country, but also to facilitate international shipment processing in the destination country. For example, such aggregation of international shipment items may be utilized to enable commercial customs clearance of the items in the destination country. One or more label, manifest, declarations form, and/or other international shipment documentation may be generated by the international processing provider in association with the aggregated international shipment items for use in international shipment processing in the destination country. Such international shipment documentation may be attached to or included with the aggregated items (e.g., attached to a bag, box, or other container incarcerating the items) and/or transmitted electronically to the destination country for use in international shipment processing of the items in the destination country.

As can be appreciated from the foregoing, international shipment processing provided by an international processing provider of embodiments herein may include generation of various documentation and/or information in association with an item. In operation of some embodiments utilizing multiple shipping labels for a shipped item, the international processing provider may generate a shipping label for use in the delivery leg of the multiple leg international shipment. For example, a shipping label used in the ingestion leg of the multiple leg international shipment to route the item to the international processing provider may be replaced by the international processing provider with a shipping label to be used in the delivery leg of the multiple leg international shipment to route the item to the recipient.

To facilitate providing transparency with respect to the progress and status of a multiple leg international shipment item, embodiments herein provide for unified tracking information for the multiple shipment legs. For example, a unified tracking number for the multiple leg international shipment may be linked to one or more tracking numbers for the individual shipment legs. It should be appreciated, however, that tracking information provided in association with tracking numbers for the individual shipment legs may be inaccurate with respect to the multiple leg international shipment. For example, tracking information provided in association with a tracking number for an ingestion leg of a multiple leg international shipment may report the item has having been delivered when the item reaches the international processing provider. Although such information may be accurate in the context of the ingestion leg, it is inaccurate in the context of the multiple leg international shipment and thus may be confusing or otherwise undesirable to provide to a shipper or recipient. Accordingly, embodiments herein operate to manipulate tracking information provided in association with tracking numbers for the individual shipment legs to present unified tracking information that is accurate and otherwise appropriate to the multiple leg international shipment.

Embodiments operate to collect customs information or other international shipment information from a shipment initiation transaction (e.g., ecommerce purchase transaction, online marketplace sales transaction, online auction transaction, etc.) to facilitate international shipment processing. For example, information regarding a purchased or product to be shipped as part of the international shipped item may be collected from one or more systems used in the transaction. This information may be utilized to determine customs information (e.g., a goods code or category), to determine if duties or taxes are to be paid and, if so, the amount of such duties and taxes, etc. Embodiments may additionally or alternatively operate to provide international shipment processing with respect to a shipment initiation transaction. For example, an amount of duties and/or taxes to be paid with respect to the international shipment may be determined and payment therefore collected in association with the shipment initiation transaction (e.g., by adding a duty and/or tax entry into an ecommerce shopping cart in association with an international shipping option in a purchase transaction, initiating a separate user interface to perform a duty and/or tax payment transaction in association with an international shipping transaction, etc.).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
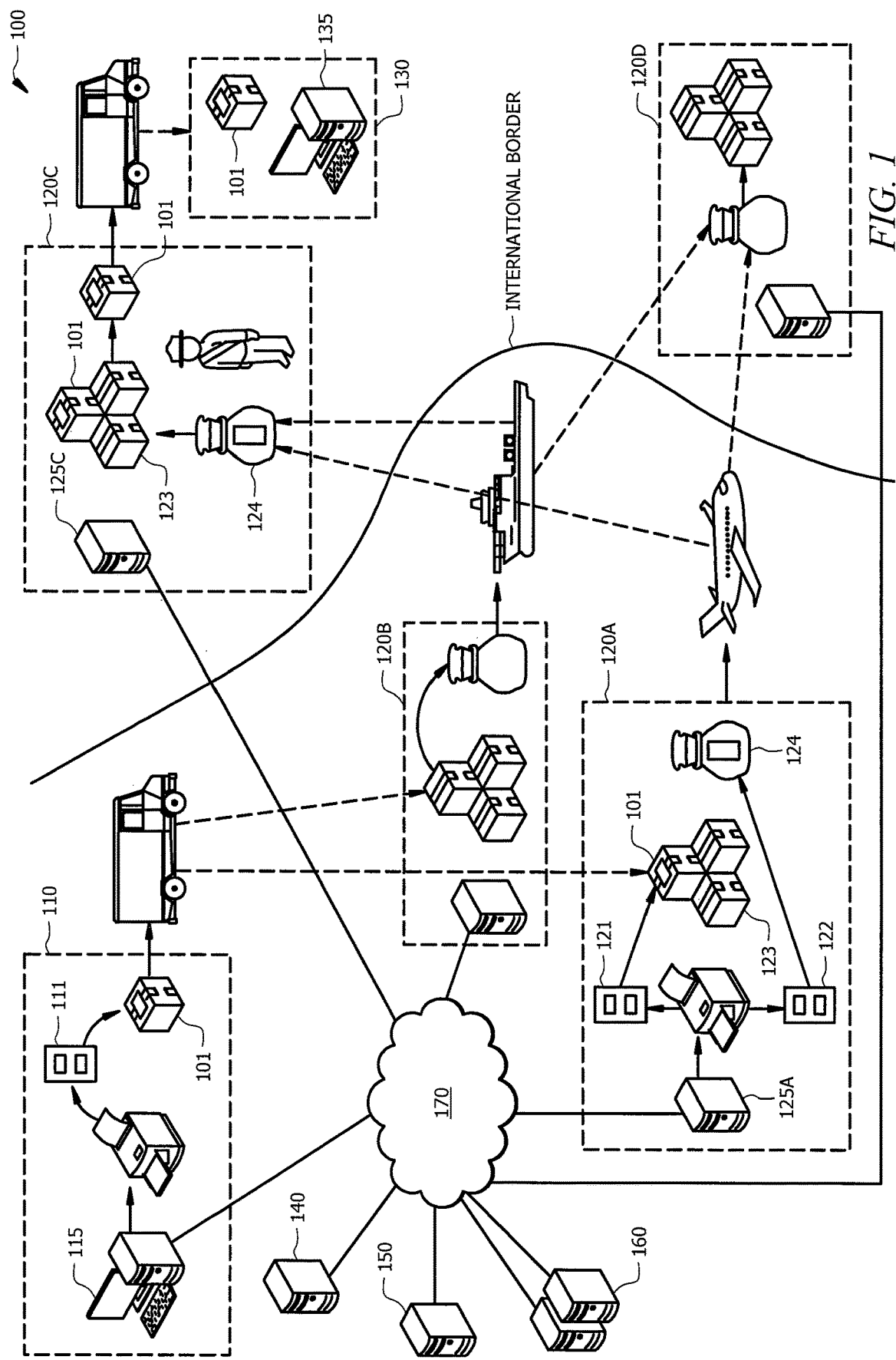
FIG. 1 shows an embodiment of a multiple leg international shipment system of embodiments of the present invention.

A system adapted in accordance with an international shipment architecture to invoke multiple shipment legs to provide international shipping of items according to embodiments herein is shown in FIG. 1. Embodiments of multiple leg international shipment system 100 of FIG. 1 are adapted to facilitate configuration of aspects of one or more of the multiple shipment legs for particular shipments, shippers, recipients, origination countries, and/or destination countries.

The embodiment of multiple leg international shipment system 100 illustrated in FIG. 1 includes a plurality of systems operable cooperatively to collect international shipping information and/or other information with respect to an item to be shipped and to operate to facilitate implementing multiple leg international shipments. Accordingly, multiple leg international shipment system 100 of the illustrated embodiment includes shipper computer system 115, international processing provider computer systems 125*a* and 125*c*, recipient computer system 135, sales transaction computer system 140, international shipment computer system 150, and additional services computer systems 160 in communication via network 170. Each of shipper computer system 115, international processing provider computer systems 125*a* and 125*c*, recipient computer system 135, sales transaction computer system 140, international shipment computer system 150, and additional services computer systems 160 may comprise one or more processor-based system (e.g., a computer based on the Intel CORE family of processors) having computer readable memory (e.g., random access memory (RAM), read only memory (ROM), hard disk drive memory, solid state disk drive memory, flash memory, etc.) operable to store and execute one or more instruction set (e.g., operating system, application program, applet, user interface, etc.) providing functionality as described herein and having suitable infrastructure and/or peripheral devices (e.g., network interface card (NIC), display device, keyboard, digital pointer, printer, audio output device, wireless communications interface, etc.) to support the described functionality. Although embodiments of shipper computer system 115, international processing provider computer systems 125*a* and 125*c*, recipient computer system 135, sales transaction computer system 140, international shipment computer system 150, and additional services computer systems 160 are described with reference to their being computer systems, the concepts of the present invention are not limited to such embodiments. For example, one or more of the foregoing processor-based systems (e.g., shipper computer system 115 and/or recipient computer system 135) may comprise a portable computing device, a tablet device, a smartphone, a personal digital assistant (PDA), a processor-based kiosk system, and/or the like.

Network 170 may comprise one or more networks providing data communication between any or all of shipper computer system 115, international processing provider computer systems 125a and 125c, recipient computer system 135, sales transaction computer system 140, international shipment computer system 150, and additional services computer systems 160. For example, network 170 may comprise a local area network (LAN), a metropolitan area network (MAN), a wide area network (WAN), a wireless LAN, a cellular network, a cable transmission system, the public switched telephone network (PSTN), the Internet, an extranet, an intranet, and/or the like.

In operation according to embodiments of multiple leg international shipment system 100, item 101 (i.e., the item to be shipped internationally, as may contain various goods or other articles) may be transported from a shipper (e.g., at shipper location 110) to an international processing provider or other origination country egress processing point (e.g., at international processing provider facility location 120a or 120b) in an ingestion leg of an international shipment. Thereafter, item 101 may be provided international processing, such as may include international border passage, including international transportation and/or customs logistics, provided by the international processing provider in a bridge leg of the international shipment. Such international processing provided by the international processing provider in a bridge leg of the international shipment may additionally or alternatively include customs processing, duty settlement, tax settlement, and/or the like. Item 101 of the illustrated embodiment may be transported from an international processing provider facility or other origination country egress processing point (e.g., international processing provider facility location 120a or 120b) to an international processing provider facility or other ingress processing point in the destination country (e.g., international processing provider facility location 120c or 120d) for further international processing, such as for customs clearance, etc., in the destination country. Item 101 may then be transported from the international processing provider or other ingress processing point in the destination country (e.g., international processing provider facility location 120c or 120d) to the recipient (e.g., at recipient location 130).

It should be appreciated that, although a single shipper location and a single recipient location are shown in the embodiment illustrated in FIG. 1 for simplicity, multiple leg international shipment system 100 of embodiments may serve any number of shipper locations and/or recipient locations, whether associated with the same shipper/recipient and/or different shippers/recipients. Similarly, although two international processing provider locations are shown in the origination country and in the destination country for simplicity, multiple leg international shipment system 100 of embodiments may accommodate any number of origination country international processing provider locations and/or destination country international processing provider locations, whether associated with the same international processing provider, different international processing providers, the same origination country, different origination countries, the same destination country, and/or different destination countries. Likewise, although the illustrated configuration of the international processing provider locations shows a single bridge leg of the multiple leg international shipment, it should be appreciated that multiple bridge legs may be utilized in an international shipment according to embodiments. For example, a particular international processing provider may utilize a plurality of locations in one or more countries (e.g., including one or more intermediary country that is neither the country of egress nor the country of ingress, including a plurality of locations within a same country, etc.) with respect to an international shipment. Additionally or alternatively, a plurality of international processing providers (e.g., an international processing provider providing services with respect to an origination country (country of initial egress) and an international processing provider providing services with respect to a destination country (country of final ingress)) may be utilized for an international shipment, whereby multiple bridge legs are implemented (e.g., a bridge leg linking the origination country to a particular intermediary country in which both international processing providers have an international processing provider location, and a bridge leg linking the intermediary country to the destination country).

As an example of a situation in which international shipping of an item may be provided by a multiple leg international shipment system of embodiments of the present invention, a shipper may be a seller of one or more items, such as through an ecommerce interface, an online marketplace, an online auction platform, etc. Accordingly, the seller may have used a processor-based system (e.g., shipper computer system 115) to input information about the item (e.g., a description, a general category or classification of the goods, price information, weight information, size information, etc.) into one or more processor-based systems facilitating sales transactions (e.g., sales transaction computer system 140), such as may comprise an ecommerce server, an online marketplace server, an online auction server, etc. Additionally or alternatively, information regarding the item, such as description, category, weight, size, etc., may be obtained from one or more other systems, such as a manufacturer's system or product database system provided by one or more of additional services computer systems 160. The recipient may have used a processor-based system (e.g., recipient computer system 135) to select one or more goods for purchase, to request international shipping, and to enter payment and/or other information (e.g., destination address information, special handling instructions, select shipping services, etc.). One or more other systems, such as a payment processing system, shipping service provider system, shipping rate database system, etc., of additional services computer systems 160 may be utilized in processing the foregoing transaction. It should be appreciated that sales transaction computer system 140 and/or international shipment computer system 150 may additionally or alternatively operate to determine rates for multiple leg international shipment services provided using multiple leg international shipment system 100, such as for calculating shipping charges to be charged to the recipient and/or seller in, or in association with, the foregoing transaction.

In facilitating multiple leg international shipment of items, embodiments operate to collect information regarding the international shipment of the item. Embodiments operate to collect customs information or other international shipment information for use in international shipment processing and/or to otherwise facilitate performance of one or more legs of the multiple shipment legs. A shipper (e.g., using shipper computer system 115) and/or recipient (e.g., using recipient computer system 135) may interact with international shipment computer system 150 to provide information regarding the item to be shipped, the contents of the item, the shipper's address, the recipient's address, the shipping services desired, special handling instructions, etc. Some or all such information may be provided directly by the shipper and/or recipient, such as through interaction with an international shipping user interface of international shipment computer system 150, or may be provided to international shipment computer system 150 indirectly, such as through collecting information from a shipment initiation transaction (e.g., ecommerce purchase transaction, online marketplace sales transaction, online auction transaction, etc.) performed using sales transaction computer system 140. For example, information regarding a purchased product or product to be shipped as part of the international shipped item may be collected from one or more systems (e.g., shipper computer system 115, recipient computer system 135, and/or sales transaction computer system 140) used in the transaction (e.g., from a listing for the goods purchased and to be shipped internationally).

The international shipment information and/or other information related to the item to be shipped may be utilized to determine customs information, to determine if duties or taxes are to be paid and, if so, the amount of such duties and taxes, etc. For example, logic of embodiments of international shipment computer system 150 may utilize information describing a product included in the item to be shipped, information regarding a sales or listing category of the product included in the item to be shipped, etc. to determine a customs goods code or category for the item to be shipped internationally. In operation according to embodiments, international shipment computer system 150 may utilize a look up table (LUT) or other data matrix to correlate descriptions of goods or other information describing goods (e.g., generic listing or sales categories for goods) to customs goods codes utilized by one or more jurisdictions (e.g., the destination country). Such a LUT or other data matrix may thus provide customs goods codes for use with international shipments associated with a plurality of different marketplaces (e.g., eBay, Amazon Marketplace, Shopify, etc.) and/or for use with international shipment of a wide variety of items shipped by a wide variety of shippers.

Additionally or alternatively, logic of embodiments of international shipment computer system 150 may operate to provide international shipment processing with respect to a shipment initiation transaction for an item to be shipped. For example, an amount of duties and/or taxes to be paid with respect to the international shipment may be determined by logic of international shipment computer system 150. In operation according to embodiments, logic of international shipment computer system 150 may make a coarse determination regarding the applicable customs code for goods in the item to be shipped (e.g., resolving the customs code to 6 of 10 digits), such as using the aforementioned information and data matrix, in order to provide a real-time estimate for duties to be paid. Similarly, logic of international shipment computer system 150 may utilize information regarding the destination address (e.g., resolving the destination address to a city code identifier (ID), such as may correspond to particular regions, such as defined by state or similar governed region, postal code or other predefined zone, and/or city or other populace area) to provide a real-time estimate for taxes to be paid. For example, a city code ID, perhaps with other information such as a description of goods, category of goods, category of recipient, etc., may be utilized with a LUT or other data matrix to estimate the applicable taxes in the destination country.

It should be appreciated that, using any or all of the aforementioned information and/or calculations (e.g., duty estimates, tax estimates, and/or international shipping service rates) logic of international shipment computer system 150 may provide for interaction with the shipper and/or recipient during the shipment initiation transaction (e.g., sales transaction for goods to be shipped internationally) to collect payment for the international shipping services, the estimated duties, and/or the estimated taxes, perhaps including a surcharge for the prepaid duty/tax service and/or to accommodate instances where the estimated amount is lower than the actual amount demanded by the destination country authorities. For example, international shipment computer system 150 may interface with sales transaction computer system 140 to add an international shipping, duty, and/or tax entry into an ecommerce shopping cart in association with an international shipping option in a purchase transaction. Alternatively, international shipment computer system 150 may utilize a user interface to interface with a shipper and/or recipient (e.g., using shipper computer system 115 and/or recipient computer system 135) to perform an international shipping, duty, and/or tax payment transaction for an item to be shipped (e.g., in association with an international shipping transaction). Such embodiments may, for example, provide a delivered duties paid (DDP) service with respect to item 101.

In operation of multiple leg international shipment system 100 of embodiments, the particular shipping service providers providing the ingestion leg and delivery leg shipping services may each be individually selected, such as by logic of international shipment computer system 150 in accordance with the concepts herein. For example, international shipment computer system 150 may operate to select shipping service providers providing the ingestion leg and/or delivery leg shipping services for the individual international shipment based upon a shipping service provider providing lowest or most desired rates, providing one or more special services or handling, able to facilitate a desired delivery timeline, able to meet a desired or threshold level of reliability or veracity with respect to the particular services, etc. Embodiments may, for example, be adapted to utilize variety of domestic shipping services of a plurality of shipping service providers (e.g., a domestic postal service, such as USPS, a local courier service, a domestic (or domestic branch of) parcel service, a less than a truckload (LTL) service, etc.) within an origination country for an ingestion leg and within a destination country for a delivery leg of an international shipment. Accordingly, a particular shipping service provider and/or the particular shipping service to be provided by the shipping service provider may be selected for meeting one or more needs or desires with respect to the individual international shipment.

In operation according to embodiments, shipper computer system 115, sales transaction computer system 140, and/or international shipment computer system 150 cooperate during a shipment initiation transaction (e.g., ecommerce purchase transaction, online marketplace sales transaction, online auction transaction, etc.) to collect international shipment information, whereby international shipment computer system 150 may analyze the international shipment information, or some portion thereof, to select a particular shipping service provider and/or particular shipping service for an ingestion leg of a multiple leg international shipment and/or to select a particular shipping service provider and/or particular shipping service for a delivery leg of the multiple leg international shipment. For example, logic of international shipment computer system 150 may analyze shipper information, such as shipper address, shipper country, shipper type (e.g., high volume shipper, low volume shipper, sophisticated international shipper, unsophisticated international shipper, company, individual, etc.), shipper history, etc., recipient information, such as recipient address, recipient country, recipient type (e.g., high volume recipient, low volume recipient, sophisticated international recipient, unsophisticated international recipient, company, individual, etc.), recipient history, etc., shipping services information, such as shipping services requested, special handling instructions, shipment stream ingestion characteristics (e.g., an item of a bulk item shipment, a single item shipment, delivery by shipper to shipping service provider depot, pickup at a shipper location, loading dock pickup, non-loading dock pickup, etc.), shipment stream termination characteristics (e.g., an item of a bulk item delivery, a single item delivery, recipient will call at a shipping service provider depot, delivery to a recipient location, loading dock delivery, non-loading dock delivery, etc.), preferences regarding shipping service providers, etc., item information, such as item physical attributes (e.g., size, weight, unusual or non-standard dimension(s), etc.), special handling requirements (e.g., hazardous materials, perishable materials, fragile contents, live animal/organism, etc.), and/or the like. Using such information, logic of international shipment computer system 150 may determine a best or otherwise suitable shipping service provider in the origination country to provide shipping services for the ingestion leg of a multiple leg international shipment and/or a best or otherwise suitable shipping service provider in the destination country to provide shipping services for the delivery leg of the multiple leg international shipment.

It should be appreciated that, although some overlapping international shipment information may be utilized in the selection of a shipping service provider in the origination country and in the selection of a shipping service provider in the destination country, embodiments may make each shipping service provider determination for a multiple leg international shipment separately. Accordingly, a shipping service provider for each of the ingestion and delivery legs may be independently determined to be most appropriate for achieving the multiple leg international shipment. Embodiments may, however, make correlated selections of shipping service providers for a multiple leg international shipment, such as to achieve volume discounts using the services of a particular shipping service provider, to facilitate uniform handling of the item, to accommodate shipper/recipient preferences, etc.

In addition to or in the alternative to operation to provide selection of the particular shipping service providers providing the ingestion leg and/or delivery leg shipping services, embodiments of multiple leg international shipment system 100 operates to select a particular international processing provider and/or particular international processing provider facility for a bridge leg of the multiple leg international shipment. In operation according to embodiments, international processing provider provides services for facilitating the international border passage of the item. Accordingly, an international processing provider utilized according to embodiments may perform origination country egress processing of items at one or more facility disposed in the origination country and/or destination country ingress processing of items at one or more facility disposed in the destination country. Such egress and ingress processing may include processing to avoid refusal of items within the destination country, processing for customs clearance, processing to collect and/or remit duties and taxes, and/or the like, as discussed in further detail below. A particular international processing provider may have a plurality of facilities within a particular origination and/or destination country (e.g., at different geographic locations), some or all of which may provide different services, handling for different items, have different international transportation options, etc. For example, international processing provider facility locations 120a and 120b and/or international processing provider facility locations 120c and 120d may be operated by a same international processing provider. Additionally or alternatively, a plurality of international processing providers may have one or more facilities within a particular origination and/or destination country (e.g., at different geographic locations), some or all of which may provide different services, handling for different items, have different international transportation options, etc. For example, international processing provider facility locations 120a and 120b and/or international processing provider facility locations 120c and 120d may be operated by different international processing providers.

In operation according to embodiments, logic of international shipment computer system 150 selects a particular international processing provider and/or a particular international processing provider facility for the international shipment of an item. For example, international shipment computer system 150 may analyze the international shipment information, or some portion thereof, to select a particular international processing provider and/or particular international processing provider facility for a multiple leg international shipment. Selection of the particular international processing provider may, for example, be based upon the international processing provider serving the origination and/or destination country, providing customs clearance processing or other international processing services with respect to particular type of goods included in the shipped item, providing selected or desired services (e.g., DDP service, expedited international processing services, etc.), one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), one or more characteristic of the shipping service provider used in the ingestion leg and/or delivery leg (e.g., ability to accept shipment from shipping service provider, provide shipments to shipping service provider, existing cooperative data and/or logistics infrastructure, etc.), and/or the like. Additionally or alternatively, selection of the particular international processing provider facility may, for example, be based upon the international processing provider facility's proximity to the shipper, the recipient, the origination country, and/or the destination country, the international processing provider facility's capability for handling a particular type of goods included in the shipped item, one or more characteristic of the shipping service provider used in the ingestion leg and/or delivery leg (e.g., physical infrastructure for accepting shipment from shipping service provider, providing shipments to shipping service provider, proximity to shipping service provider facilities, etc.), and/or the like. It should be appreciated that the international processing provider facility in the origination country and the international processing provider facility in the destination country may be associated with a same or different international processing provider according to embodiments herein.

As can be appreciated from the foregoing, an item shipped in accordance with a multiple leg international shipment of embodiments may thus be routed from a shipper location or other shipment stream ingestion point to a recipient location or other shipment stream termination point via one or more international processing provider facility location corresponding to a selected international processing provider and/or international processing provider facility. Accordingly, embodiments utilize multiple shipping labels for an item shipped using a multiple leg international shipment. For example, shipping label 111 may be utilized for the ingestion leg to route the item from shipper location 110 to a selected international processing provider and/or a selected international processing provider facility in the origination country (e.g., international processing provider location 120a). Additionally, shipping label 121 may be utilized for the delivery leg to route the item from a selected international processing provider and/or a selected international processing provider facility in the destination country (e.g., international processing provider location 120c) to the recipient location (e.g., recipient location 130).

It should be appreciated that there may not be a one-to-one correspondence between shipping labels 111 utilized for the ingestion leg and shipping labels 121 utilized for the delivery leg of international shipments of embodiments. For example, a shipper making a number of international shipments may include a plurality of items being shipped internationally (whether directed to a same recipient or different recipients, whether directed to the same destination country or different destination countries, etc.) in a same bag, box, or other container using a single shipping label 111 where the international shipping for each such item is to be handled by a same international processing provider and international processing provider facility, such as to reduce shipping costs, to more efficiently handle and transport the items, etc. Additionally or alternatively, an international processing provider handling a number of international shipments directed to a same recipient may include a plurality of items (whether from a same shipper or different shippers, whether processed at a same international processing provider facility in the origination country of different international processing provider facilities in the origination country, etc.) in a same bag, box, or other container using a single shipping label 121.

In operation according to embodiments, a shipping label and/or other documentation that is different than the aforementioned ingestion leg and/or delivery leg shipping labels is utilized in the bridge leg of a multiple leg international shipment to route the item for international border passage. For example, international documentation 122 may comprise a shipping label utilized with respect to a plurality of international shipment items (e.g., aggregated items 123 in container 124, such as may comprise a plurality of items being provided international transportation in a same bag, box, or other container) for transport between the origination country and destination country. In the illustrated embodiment, container 124 containing item 101 and other items shipped in a multiple leg international shipment are transported between an international processing provider facility in the origination country (e.g., international processing provider location 120a) to an international processing provider facility in the destination country (e.g., international processing provider location 120c) via various means (e.g., commercial carriers, private charters, air, land, sea, etc.), wherein a shipping label of international documentation 122 may be utilized in facilitating the international transport of the items and/or the international processing (e.g., customs processing, duty and/or tax settlement, etc.) of the items. It should be appreciated, however, that international documentation 122 may additionally or alternatively comprise one or more documents not considered shipping labels. For example, international documentation 122 of embodiments may comprise bills of lading, manifests, customs forms, tax forms, packing slips, and/or the like, such as may be utilized for international processing of the items in the origination country and/or the destination country.

Shipping label 111 used in the ingestion leg of a multiple leg international shipment, providing the appropriate shipping label for routing item 101 to a selected international processing provider using a shipping service provider selected for the origination country, may be generated and/or printed by or on behalf of the shipper (e.g., using shipper computer system 115 at shipper location 110). Shipping label 121 used in the delivery leg of a multiple leg international shipment, providing the appropriate shipping label for routing item 101 from an international processing provider to the recipient using a shipping service provider selected for the destination country, may similarly be generated and/or printed by or on behalf of the shipper. However, embodiments of the invention operate to apply shipping label 121 used in the delivery leg of a multiple leg international shipment after completion of an ingestion leg of the multiple leg international shipment is complete (e.g., after arrival of item 101 at an international processing provider facility). Accordingly, embodiments may generate and/or print shipping label 121 used in the delivery leg at a location other than the shipper location (e.g., using international processing provider computer system 125a at international processing provider location 120a) to replace shipping label 111 for use in the delivery leg of the multiple leg international shipment. It should be appreciated that generation and/or printing of a shipping label according to embodiments may utilize one or more system of additional services computer systems 160, such as a shipping service provider system for obtaining tracking number information, shipping label formatting and/or content information, etc., a postage indicia service provider system for obtaining a prepaid value indicia (e.g., postage meter stamp) for including on the shipping label, and/or the like.

The aforementioned international shipment information and/or other information related to the item to be shipped may, for example, be utilized by international processing provider computer system 125a and/or international shipment computer system 150 to generate and/or print shipping label 121 at international processing provider location 120a in the origination country for routing item 101 from the international processing provider to the recipient using a shipping service provider selected for the destination country. Alternatively, the international shipment information and/or other information related to the item to be shipped may, for example, be utilized by international processing provider computer system 125c and/or international shipment computer system 150 to generate and/or print shipping label 121 at international processing provider location 120c in the destination country for routing item 101 from the international processing provider to the recipient using a shipping service provider selected for the destination country. International processing provider computer system 125a and/or international shipment computer system 150 of embodiments generate and/or print international documentation 122 used in the bridge leg of a multiple leg international shipment, such as using the aforementioned international shipment information and/or other information related to the item to be shipped.

Embodiments of multiple leg international shipment system 100 utilize domestic shipping services with respect to the ingestion leg and/or the delivery leg. Accordingly, the aforementioned multiple shipping labels may utilize a domestic shipping label configuration for shipping label 111 utilized for the ingestion leg of the multiple leg international shipment and/or for shipping label 121 utilized for the delivery leg of the multiple leg international shipment. In operation according to embodiments, such a domestic shipping label configuration does not include international shipment information (e.g., package contents information, customs information, declared value information, international destination information, and/or the like). For example, where a domestic shipping service is utilized in the destination country for the delivery leg, shipping label 121 may comprise recipient address information and domestic address information (e.g., international processing provider or other ingress processing point address, domestic return agent address, etc.) for a return shipping address, without international customs information (e.g., shipping labels utilized with respect to the ingestion leg and delivery leg of embodiments of a multiple leg international shipment may comprise standard domestic shipping label formats and associated information as generally accepted by the respective shipping service providers). Accordingly, where package theft may be a concern, items shipped using a multiple leg international shipment in accordance to the concepts herein may have information regarding it being an international shipment and information disclosing the contents or value of the item obfuscated on one or more shipping labels utilized in providing the multiple leg international shipment.

It should be appreciated that, although embodiments may utilize one or more shipping label conforming to a shipping service provider standardized format and content, embodiments may additionally or alternatively include information or other features unique to the multiple leg international shipment. For example, although not including customs information or other international shipment information, embodiments of an ingestion leg and/or delivery leg shipping label may include unified tracking information (as described further below) and/or other information used with respect to the multiple leg international shipment.

Although customs information or other international shipment information may not be included on one or more label utilized for a particular leg of a multiple leg international shipment, embodiments nevertheless operate to collect such information and provide for customs clearance and other international processing for the item. For example, an international processing provider selected for use with respect to the multiple leg international shipment preferably not only facilitates international border passage (e.g., international transportation, logistics, etc.), but also facilitates international processing (e.g., customs processing, duty and/or tax settlement, etc.). Accordingly, international shipment computer system 150 may provide international shipment information, including information regarding customs, duties, taxes, etc., to one or more of international processing provider computer systems 125*a* and 125*c*, for use in facilitating customs clearance and other international processing for the item. International documentation 122 of embodiments may, for example, be generated and/or printed to include customs information and/or other international shipment information to facilitate appropriate international processing of the item(s).

In operation of multiple leg international shipment system 100 of embodiments, international processing information, such as customs, duty, and/or tax information, is provided in a destination country prior to the arrival of items shipped internationally in a multiple leg international shipment of embodiments herein. For example, such international processing information may be transmitted electronically by international shipment computer system 150 and/or international processing provider computer system 125*a* to international processing provider computer system 125*b* at the international processing provider facility or other ingress processing point in the destination country for initiation of international processing of the shipment prior to arrival of the corresponding item(s) (e.g., aggregated items 123 including item 101) in the destination country. The international processing provider may utilize this information to expedite international shipment processing when the items arrive in the destination or to otherwise reduce the timeline for ultimate delivery of items to recipients.

Additionally or alternatively, international processing of the item may be performed by the international processing provider of embodiments prior to the item leaving the origination country (or otherwise prior to the item entering the destination country). For example, an international processing provider selected with respect to a multiple international shipment may inspect goods within item 101 at international processing provider location 120*a* for proper customs goods code or category assignment, conformance to importation restrictions of the destination country, duty and/or tax settlement, etc. to facilitate expedited international shipment processing in the destination country and/or to avoid situations in which item 101 is refused in the destination country and must be returned to the origination country.

To facilitate providing transparency with respect to the progress and status of item 101 during the multiple leg international shipment, embodiments of multiple let international shipment system 100 provide for unified tracking information for the multiple shipment legs. For example, logic of international shipment computer system 150 operates to provide a unified tracking number for the multiple leg international shipment. In operation according to embodiments, international shipment computer system 150 may generate a unified tracking number or other identifier for the multiple leg international shipment of item 101 and provide that tracking number to the shipper and/or recipient (e.g., via shipper computer system 115 and/or recipient computer system 135). When a tracking number for the ingestion leg of the multiple leg international shipment is assigned or available by the shipping service provider selected for this leg of the international shipment (e.g., upon generation of shipping label 111), this shipping leg tracking number is associated with the unified tracking number (e.g., in a database maintained by international shipment computer system 150) according to embodiments. Likewise, when a tracking number for the delivery leg of the multiple leg international shipment is assigned or available by the shipping service provider selected for this leg of the international shipment (e.g., upon generation of shipping label 121), this shipping leg tracking number is also associated with the unified tracking number according to embodiments. Where the bridge leg of the multiple leg international shipment has one or more tracking numbers associated therewith, such as when assigned by the international processing agent, a commercial carrier providing international transportation of the item, etc., these shipping leg tracking numbers are also associated with the unified tracking number according to embodiments.

In operation according to embodiments, tracking information provided in association with the individual legs of the multiple leg international shipment is utilized in reporting tracking status with respect to the item. Accordingly, a shipper, recipient, or other individual may utilize a unified tracking number to access tracking information associated with various legs of the multiple leg international shipment. Tracking information provided in association with tracking numbers for the individual shipment legs may, however, be inaccurate with respect to the multiple leg international shipment. For example, tracking information provided in association with a tracking number for an ingestion leg of a multiple leg international shipment may report the item has having been delivered when item 101 reaches international processing provider location 120a. Although such information may be accurate in the context of the ingestion leg, it is inaccurate in the context of the multiple leg international shipment and thus may be confusing or otherwise undesirable to provide to a shipper or recipient. Accordingly, logic of international shipment computer system 150 of embodiments operates to manipulate tracking information provided in association with tracking numbers for the individual shipment legs to present unified tracking information that is accurate and otherwise appropriate to the multiple leg international shipment. For example, tracking information provided in association with an ingestion leg of the multiple leg international shipment indicating a "delivered" status may be manipulated to reflect "accepted for international processing" or other status more appropriate to the multiple leg international shipment.

It should be appreciated that the bridge leg of a multiple leg international shipment may not have a tracking number associated therewith. For example, the international processing provider may utilize bulk, chartered, or other shipping means wherein tracking numbers or other traditional shipment tracking information is not provided. In operation according to embodiments of the invention, data regarding the status of shipment of an item is nevertheless obtained from the international processing provider for use in reporting tracking type information for an item using a unified tracking number. For example, personnel of international processing provider may input information regarding the departure, transit, and/or arrival of container 124, containing item 101, into international processing provider computer system 120a and/or 120c during the bridge leg of the multiple leg international shipment. Item 101 may be associated with container 124 in one or more database of multiple leg international shipment system 100 (e.g., a database of international processing provider computer system 120a and/or 120c, a database of international shipment computer system 150, etc.), whereby this information may be used to associate the information regarding the status of container 124 with that of item 101. Thus, reporting of the tracking status of item 101 may be provided, perhaps using the aforementioned operation to manipulate the information to present unified tracking information that is accurate and otherwise appropriate to the multiple leg international shipment, throughout the bridge leg of embodiments of a multiple leg international shipment even where traditional tracking information for this leg is not available.

It should be appreciated that any or all of shipper computer system 115, international processing provider computer systems 125a and 125c, recipient computer system 135, sales transaction computer system 140, international shipment computer system 150, and additional services computer systems 160 may cooperate or otherwise operate to provide functionality ancillary to the international shipment of items. For example, one or more such systems may operate to process payment and/or settlements in association with various aspects of the services provided (e.g., to provide payment to one or more shipping service provider in association with ingestion leg and/or delivery leg shipment services, one or more international processing provider in association with international processing and/or bridge leg shipment services, one or more agency of the origination and/or destination countries in association with duties, taxes, and/or tariffs, etc.). Additionally or alternatively, one or more such systems may operate to process collection and/or payment in association with various aspects of the services provided (e.g., to collect payment from a shipper and/or recipient for shipping services, etc.).

Figure 2:
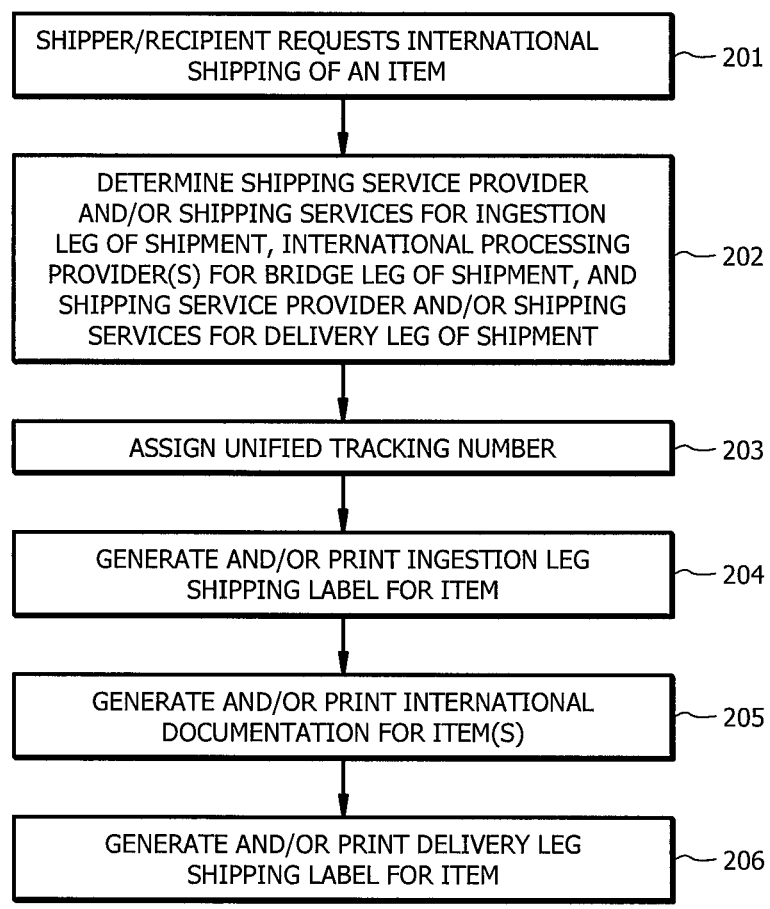
FIG. 2 shows a flow diagram of operation of a multiple leg international shipment system in accordance with embodiments of the present invention.

Having described embodiments of multiple leg international shipment system 100 above, attention is directed to FIG. 2 wherein flow 200 providing exemplary operation of multiple leg international shipment system 100 in accordance with embodiments herein. At block 201 of the illustrated embodiment of flow 200, the shipper and/or requester request international shipping of an item. For example, the seller may have listed one or more items for sale using shipper computer system 115 and sales transaction computer system 140 and the recipient may have purchased an item using recipient computer system 135, whereby the item is to be shipped internationally (e.g., the shipper and recipient are disposed in different countries).

In operation at block 202 of the illustrated embodiment, one or more shipping service provider, shipping service, international processing provider, and/or international processing provider facility are determined for providing the requested international shipping. It should be appreciated that the international shipment of the item provided according to embodiments comprises multiple leg international shipment in accordance with the concepts herein, although the shipper and/or recipient may have merely requested international shipping (e.g., the shipper and/or recipient may, at least initially, be unaware of or ambivalent to the particular underlying multiple leg international shipment technique and instead simply be desirous of having the item transported safely and reliably in accordance with one or more shipping parameters, such as transit time, cost, special handling, etc.). In determining the one or more shipping service provider, shipping service, international processing provider, and/or international processing provider facility for providing the requested international shipping, logic of international shipment computer system 150 analyzes information regarding the item to be shipped, international shipment information associated with the item, information regarding the shipper, information regarding the recipient, information regarding shipping service providers, information regarding the shipping services and special handling requested by the shipper/recipient, information regarding international shipping service providers, and/or the like. Logic of international shipment computer system 150 of embodiments may analyze shipper information, such as shipper address, shipper country, shipper type (e.g., high volume shipper, low volume shipper, sophisticated international shipper, unsophisticated international shipper, company, individual, etc.), shipper history, etc., recipient information, such as recipient address, recipient country, recipient type (e.g., high volume recipient, low volume recipient, sophisticated international recipient, unsophisticated international recipient, company, individual, etc.), recipient history, etc., shipping services information, such as shipping services requested, special handling instructions, shipment stream ingestion characteristics (e.g., an item of a bulk item shipment, a single item shipment, delivery by shipper to shipping service provider depot, pickup at a shipper location, loading dock pickup, non-loading dock pickup, etc.), shipment stream termination characteristics (e.g., an item of a bulk item delivery, a single item delivery, recipient will call at a shipping service provider depot, delivery to a recipient location, loading dock delivery, non-loading dock delivery, etc.), preferences regarding shipping service providers, etc., item information, such as item physical attributes (e.g., size, weight, unusual or non-standard dimension(s), etc.), special handling requirements (e.g., hazardous materials, perishable materials, fragile contents, live animal/organism, etc.), and/or the like.

Using any or all the foregoing information, international shipment computer system 150 may determine the particular shipping service provider(s) and/or shipping service(s) providing the ingestion leg and/or delivery leg shipping services for the multiple leg international shipment of the item. For example, a shipping service provider providing the ingestion leg and/or delivery leg shipping services may be determined from a plurality of shipping service providers within an origination country and/or within a destination country based upon their providing lowest or most desired rates, providing desired shipping services or shipping services compatible with services requested by the shipper/recipient, providing one or more special services or handling, able to facilitate a desired delivery timeline, able to meet a desired or threshold level of reliability or veracity with respect to the particular services, etc. Using such information, logic of international shipment computer system 150 may determine a best or otherwise suitable shipping service provider in the origination country to provide shipping services for the ingestion leg of a multiple leg international shipment and/or a best or otherwise suitable shipping service provider in the destination country to provide shipping services for the delivery leg of the multiple leg international shipment. Additionally, shipping service(s) used with respect to the ingestion leg and/or delivery leg may be determined from a plurality of shipping services offered by one or more of the shipping service providers of the plurality of shipping service providers based upon the shipping services requested by the shipper/recipient, shipping services compatible with services requested by the shipper/recipient, shipping services meeting all or many (e.g., most) criteria of the international shipment requested by the shipper/recipient, shipping services suitable for handling contents of the item to be shipped, etc. Accordingly, particular shipping service provider(s) and/or particular shipping service(s) to be provided by the shipping service provider(s) for meeting one or more needs or desires with respect to individual international shipment are determined in accordance with the illustrated embodiment of flow 200.

Further, using any or all the foregoing information, international shipment computer system 150 may determine the particular international processing provider(s) and/or international processing provider facility/facilities providing bridge leg shipping services for the multiple leg international shipment of the item. For example, an international processing provider providing the bridge leg shipping services may be determined from a plurality of international processing providers based upon based upon the international processing provider serving the origination and/or destination country, providing customs clearance processing or other international processing services with respect to particular type of goods included in the shipped item, providing selected or desired services (e.g., DDP service, expedited international processing services, etc.), one or more characteristic of the shipper (e.g., the sophistication of the shipper with respect to international shipping, the amount of international shipment items shipped by the shipper, etc.), one or more characteristic of the recipient (e.g., the sophistication of the recipient with respect to international shipping, the amount of international shipment items received by the shipper, etc.), one or more characteristic of the shipping service provider used in the ingestion leg and/or delivery leg (e.g., ability to accept shipment from shipping service provider, provide shipments to shipping service provider, existing cooperative data and/or logistics infrastructure, etc.), and/or the like. Additionally, selection of a particular international processing provider facility may, for example, be based upon the international processing provider facility's proximity to the shipper, the recipient, the origination country, and/or the destination country, the international processing provider facility's capability for handling a particular type of goods included in the shipped item, one or more characteristic of the shipping service provider used in the ingestion leg and/or delivery leg (e.g., physical infrastructure for accepting shipment from shipping service provider, providing shipments to shipping service provider, proximity to shipping service provider facilities, etc.), and/or the like.

As an example, the international processing provider or international processing provider facility with respect to the origination country may be selected so as to provide the shortest or most expedited route from the item ingestion point (e.g., shipper location) to the international processing provider facility. Additionally or alternatively, the international processing provider or international processing provider facility with respect to the origination country may be selected so as to provide a shortest or most efficient route to the destination country. Further, the international processing provider or international processing provider facility with respect to the origination country may be selected so as to accommodate the shipper, such as for a shipper shipping a large number of items, to provide services requested or needed by the shipper, etc. Similarly, the international processing provider or international processing provider facility with respect to the destination country may be selected so as to provide the shortest or most expedited route from the international processing facility to the delivery point (e.g., recipient location). Additionally or alternatively, the international processing provider or international processing provider facility with respect to the destination country may be selected so as to provide a shortest or most efficient route from the origination country. Further, the international processing provider or international processing provider facility with respect to the destination country may be selected so as to accommodate the shipper and/or recipient, such to provide services requested or needed by the shipper and/or recipient, etc. Accordingly, particular international processing provider(s) and/or particular international processing provider facility/facilities for meeting one or more needs or desires with respect to individual international shipment are determined in accordance with the illustrated embodiment of flow 200.

In operation of flow 200 at block 202 of embodiments, the particular shipping service provider(s), the particular shipping service(s), the particular international processing provider(s), and/or the particular international processing provider facility/facilities for a multiple leg international shipment may each be individually selected. However, it should be appreciated that although any or all of the foregoing may be individually selected, the determination for their selection may not be independent, or wholly independent, of one another. For example, selection of a particular shipping service provider, whether for the ingestion leg or delivery leg, may be based at least in part upon the shipping service provider offering shipping services meeting a selected shipping service for the multiple leg international shipment. Similarly, selection of a particular international processing provider may be based at least in part upon a selected shipping service provider for the multiple leg international shipment. Accordingly, the embodiment of flow 200 illustrated in FIG. 2 shows the determinations with respect to the one or more shipping service provider, shipping service, international processing provider, and/or international processing provider facility being performed cooperatively in block 202. Alternative embodiments of the invention may, however, operate to independently and individually selected one or more shipping service provider, shipping service, international processing provider, and/or international processing provider facility (e.g., one or more determination of block 202 may be performed in separate blocks of an alternative flow 200).

At block 203 of the illustrated embodiment a unified tracking number, as may be used in providing tracking information for the shipped item during the multiple leg international shipment, is assigned for use with respect to the multiple leg international shipment. In operation according to embodiments of flow 200, international shipment computer system 150 may generate the unified tracking number and assign that unified tracking number to the multiple leg international shipment for the item being shipped. Such a unified tracking number may be provided to the shipper and/or recipient (e.g., via shipper computer system 115 and/or recipient computer system 135) for their use in tracking the item throughout the multiple leg international shipment. Accordingly, when a tracking number for the ingestion leg of the multiple leg international shipment is assigned or available by the shipping service provider selected for the ingestion leg of the international shipment, that tracking number may be associated with the unified tracking number (e.g., in a database maintained by international shipment computer system 150) for use in obtaining tracking information for the item with respect to the ingestion leg. Likewise, when a tracking number for the delivery leg of the multiple leg international shipment is assigned or available by the shipping service provider selected for the delivery leg of the international shipment, that tracking number may also be associated with the unified tracking number for use in obtaining tracking information for the item with respect to the delivery leg. Similarly, tracking number information for the bridge leg of the multiple leg international shipment (where a tracking number is available with respect to the bridge leg) and/or status information regarding handling of the item by the international processing provider(s) is associated with the unified tracking number of use in obtaining tracking information for the item with respect to the bridge leg.

It should be appreciated that the assignment of a unified tracking number to the multiple leg international shipment of block 203 may be performed within embodiments of flow 200 at a different point than shown. For example, assignment of a unified tracking number may occur prior to or during operation to determine one or more shipping service provider, shipping service, international processing provider, and/or international processing provider facility for providing the requested international shipping. Alternatively, assignment of a unified tracking number may occur after generation and/or printing of any or all shipping labels and/or international documentation utilized for the multiple leg international shipment.

At block 204 of flow 200 illustrated in FIG. 2, a shipping label for use in the ingestion leg of the multiple leg international shipment is generated and/or printed. For example, shipper computer system 115 at shipper location 110 may be used to print shipping label 111 used by the shipping service provider selected for the ingestion leg of the multiple leg international shipment. The ingestion leg shipping label of embodiments provides the appropriate shipping label for routing the item being shipped to the selected international processing provider by the shipping service provider selected for the ingestion leg.

At block 205 of the illustrated embodiment, international documentation for use in the bridge leg of the multiple leg international shipment is generated and/or printed. For example, international processing provider computer system 125a at international processing provider location 120a may be used to print international documentation used by the international processing provider, export control agents in the origination country, import control agents in the destination country, customs agents, etc. for the bridge leg of the multiple leg international shipment. The bridge leg international documentation of embodiments provides the appropriate documentation for international processing and/or international transport of the item being shipped for the bridge leg.

At block 206 of flow 200 illustrated in FIG. 2, a shipping label for use in the delivery leg of the multiple leg international shipment is generated and/or printed. For example, international processing provider computer system 125a at international processing provider location 120a or international processing provider computer system 125c at international processing provider location 120c may be used to print shipping label 121 used by the shipping service provider selected for the delivery leg of the multiple leg international shipment. Alternatively, shipper computer system 115 at shipper location 110 may be used to print shipping label 121 used by the shipping service provider selected for the delivery leg of the multiple leg international shipment. The delivery leg shipping label of embodiments provides the appropriate shipping label for routing the item being shipped from the selected international processing provider to the recipient by the shipping service provider selected for the delivery leg.

It should be appreciated that generation of a shipping label or international documentation may be performed at a place that is different than the printing of the shipping label or international documentation. For example, where postage indicia is included in one or more of the shipping labels (e.g., a shipper's or recipient's postage meter account is utilized for generating prepaid value bearing indicia), the shipping label may be generated using a system having access to an account (e.g., postal account or postage value sorted in a postage security device) for the postage indicia. In operation of an exemplary embodiment, wherein the shipper provides an account utilized with respect to one or more leg of the multiple leg international shipment, one or more shipping label may be generated by shipper computer system 115, although the shipping label is printed by international processing provider computer system 125a or international processing provider computer system 125c. In operation of another exemplary embodiment, wherein the recipient provides an account utilized with respect to one or more leg of the multiple leg international shipment, one or more shipping label may be generated by recipient computer system 135, although the shipping label is printed by shipper computer system 115, international processing provider computer system 125*a*, or international processing provider computer system 125*c*. In accordance with yet another exemplary embodiment, international processing provider computer system 125*a* may be utilized to generate some or all of the international documentation utilized with respect to the multiple leg international shipment, whereas international processing provider computer system 125*c* may be utilized to print at least some portion of the international documentation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving, via a sales transaction computer system and at an international shipment computer system that is distinct from the sales transaction computer system, an international shipping request for an item, wherein the international shipping request includes product data associated with the item;
    generating, by the international shipment computer system and based on the product data received via the sales transaction computer system, international processing information, wherein generating the international processing information comprises associating the product data with customs goods codes stored in a database, wherein the international processing information comprises customs, duty, and tax information, and wherein associating the product data with the customs goods codes stored in the database comprises:
        correlating the product data with a generic listing or sales categories for goods codes stored in the database, and
        identifying one or more customs goods codes corresponding to the item;
    providing, by the international shipment computer system, the international processing information to an international processing provider computer system to facilitate international processing of the item prior to arrival of the item at a destination country;
    generating an origination country domestic shipping label for use in an ingestion leg of a multiple leg international shipment of the item, wherein shipping services of the ingestion leg transport the item within the origination country to an international processing provider for international processing of the item, and wherein the origination country domestic shipping label has a first tracking number associated therewith that corresponds to tracking information for the item stored by a first shipping service provider computer system;
    generating a destination country domestic shipping label for use in a delivery leg of the multiple leg international shipment of the item, wherein shipping services of the delivery leg transport the item within the destination country to a recipient location after the international processing of the item, wherein the international processing of the item is facilitated by transmission of the international processing information to the international processing provider computer system prior to arrival of the item at the destination country, and wherein the destination country domestic shipping label has a second tracking number associated therewith that corresponds to tracking information for the item stored by a second shipping service provider computer system;
    assigning a unified tracking number to the multiple leg international shipment of the item;
    storing, by an international shipment computer system, the unified tracking number in a database associating the first tracking number and the second tracking number with the unified tracking number, wherein the database is configured to store the customs goods codes;
    obtaining, by the international shipment computer system from at least one of the first shipping service provider computer system or the second shipping service provider computer system, the corresponding tracking information for the item using at least one of the first tracking number or the second tracking number for a respective individual shipment leg of the multiple leg international shipment;
    manipulating, by the international shipment computer system, the tracking information provided for the item based on the at least one of the first tracking number or the second tracking number for the respective individual shipment leg of the multiple leg international shipment, wherein manipulating comprises changing status data of the tracking information obtained using the at least one first tracking number or the second tracking number that corresponds to and is accurate for domestic shipment of the item reported for the respective individual shipment leg to status data that is accurate in a context of the multiple leg international shipment; and
    reporting, by the international shipment computer system, a tracking status of the item by accessing the changed tracking information and presenting tracking status information that is accurate in the context of the multiple leg international shipment using the unified tracking number.

2. The method of claim 1, further comprising:
    replacing the origination country domestic shipping label with the destination country domestic shipping label after the item has arrived at an international processing provider facility.

3. The method of claim 1, wherein the origination country domestic shipping label and the destination country domestic shipping label do not include international customs or duty information.

4. The method of claim 1, further comprising:
    selecting a shipping service provider for providing the shipping services of the ingestion leg from a plurality of shipping service providers providing domestic shipping services in the origination country, wherein the first shipping service provider computer system corresponds to the selected shipping service provider providing the shipping services of the ingestion leg, wherein the selecting the shipping service provider for providing the shipping services of the ingestion leg comprises:
analyzing domestic shipping rates for the plurality of shipping service providers;
analyzing domestic shipping services provided by the plurality of shipping service providers; and
selecting a shipping service provider compatible with the international processing provider.

5. The method of claim 4, further comprising:
selecting a shipping service provider for providing the shipping services of the delivery leg from a plurality of shipping service providers providing domestic shipping services in the destination country, wherein the second shipping service provider computer system corresponds to the selected shipping service provider providing the shipping services of the delivery leg.

6. The method of claim 5, wherein the selecting the shipping service provider for providing the shipping services of the delivery leg comprises:
analyzing domestic shipping rates for the plurality of shipping service providers.

7. The method of claim 5, wherein the selecting the shipping service provider for providing the shipping services of the delivery leg comprises:
analyzing domestic shipping services provided by the plurality of shipping service providers.

8. The method of claim 5, wherein the selecting the shipping service provider for providing the shipping services of the delivery leg comprises:
selecting a shipping service provider compatible with the international processing provider.

9. The method of claim 5, wherein the selecting the shipping service provider for providing the shipping services of the ingestion leg and the selecting the shipping service provider for providing the shipping services of the delivery leg are selected individually.

10. The method of claim 5, further comprising:
selecting the international processing provider for providing the international processing of the item in a bridge leg of the multiple leg international shipment from a plurality of international processing providers.

11. The method of claim 10, wherein the selecting the international processing provider for providing the international processing of the item in the bridge leg comprises:
analyzing international processing provider facility locations for the plurality of international processing providers.

12. The method of claim 10, wherein the selecting the international processing provider for providing the international processing of the item in the bridge leg comprises:
analyzing an attribute of at least one of a shipper of the item or a recipient of the item.

13. The method of claim 10, wherein the selecting the international processing provider for providing the international processing of the item in the bridge leg comprises:
selecting an international processing provider compatible with a shipping service provider selected for at least one of the ingestion leg or the delivery leg.

14. The method of claim 5, further comprising:
selecting an international processing provider facility location for providing the international processing of the item in a bridge leg of the multiple leg international shipment from a plurality of international processing provider locations.

15. The method of claim 14, wherein the international processing provider is selected as a result of the selecting the international processing provider facility location.

16. The method of claim 1, wherein the status data of the unchanged tracking information comprises information that corresponds to and is accurate in a context of the ingestion leg of the multiple leg international shipment and that is inaccurate in the context of the multiple leg international shipment of the item, and wherein the status data of the changed tracking information corresponding to the ingestion leg comprises information that is accurate in the context of the multiple leg international shipment of the item.

17. The method of claim 16, wherein the information that corresponds to and is accurate in the context of the ingestion leg comprises information indicating a delivered status and the changed information corresponding to the ingestion leg comprises information indicating an international shipment processing status.

18. The method of claim 1, wherein the product data comprises a description of the item.

19. The method of claim 1, wherein associating the product data with customs goods codes stored in a database further comprises resolving the customs goods code to at least six out of ten digits.

20. A method comprising:
receiving, via a sales transaction computer system and at an international shipment computer system that is distinct from the sales transaction computer system an international shipping request for an item, wherein the international shipping request includes product data associated with the item;
selecting a shipping service provider for providing domestic shipping services in an origination country from a plurality of shipping service providers providing domestic shipping services in the origination country, wherein the selected origination country shipping service provider provides domestic shipping services for an ingestion leg of a multiple leg international shipment of the item, wherein the shipping services of the ingestion leg transport the item within the origination country to an international processing provider for international processing of the item;
selecting a shipping service provider for providing domestic shipping services in a destination country from a plurality of shipping service providers providing domestic shipping services in the destination country, wherein the selected destination country shipping service provider provides domestic shipping services for a delivery leg of the multiple leg international shipment of the item, wherein the shipping services of the delivery leg transport the item within the destination country a recipient location after the international processing of the item;
selecting at least one of the international processing provider or an international processing provider facility for providing the international processing of the item from a plurality of international processing providers or a plurality of international processing provider facilities, wherein the international processing provides a bridge leg of the multiple leg international shipment, wherein the bridge leg provides international transport of the item;
generating, by the international shipment computer system and based on the product data received via the sales transaction computer system, international processing information, wherein generating the international processing information comprises associating the product data with customs goods codes stored in a database, wherein the international processing information comprises customs, duty, and tax information, and wherein associating the product data with customs goods codes stored in the database comprises:
  correlating the product data with a generic listing or sales categories for goods codes stored in the database, and
  identifying one or more of the customs goods codes corresponding to the item;
providing, by the international shipment computer system, the international processing information to an international processing provider computer system to facilitate international processing of the item prior to arrival of the item at a destination country;
generating an origination country domestic shipping label for use in the ingestion leg of the multiple leg international shipment of the item, wherein the origination country domestic shipping label has a first tracking number associated therewith that corresponds to tracking information for the item stored by a first shipping service provider computer system associated with the selected origination country shipping service provider;
generating a destination country domestic shipping label for use in a delivery leg of the multiple leg international shipment of the item, wherein the destination country domestic shipping label has a second tracking number associated therewith that corresponds to tracking information for the item stored by a second shipping service provider computer system associated with the selected destination country shipping service provider, and wherein the international processing of the item is facilitated by transmission of the international processing information to an international processing provider computer system prior to arrival of the item at the destination country;
assigning a unified tracking number to the multiple leg international shipment of the item;
storing, by an international shipment computer system, the unified tracking number in a database associating the first tracking number and the second tracking number with the unified tracking number;
replacing the origination country domestic shipping label with the destination country domestic shipping label after the item has arrived at the international processing provider facility;
obtaining, by the international shipment computer system from at least one of the first shipping service provider system or the second shipping service provider system, the corresponding tracking information for the item using at least one of the first tracking number or the second tracking number for a respective individual shipment leg of the multiple leg international shipment;
manipulating, by the international shipment computer system, the tracking information provided for the item based on the first tracking number, wherein manipulating comprises changing information corresponding to the first tracking number from status data indicating a delivered status that is accurate for the ingestion leg of the multiple leg international shipment to status data indicating an international shipment processing status that is accurate in a context of the multiple leg international shipment; and
reporting, by the international shipment computer system, a tracking status of the item by accessing the changed tracking information and presenting tracking status information that is accurate in the context of the multiple leg international shipment using the unified tracking number.

21. The method of claim 20, wherein the origination country domestic shipping label and the destination country domestic shipping label do not include international customs or duty information.

22. The method of claim 20, wherein the selecting the shipping service provider for providing the shipping services of the ingestion leg comprises:
  selecting the shipping service provider based at least in part on criteria selected from the group consisting of domestic shipping rates for the plurality of shipping service providers, domestic shipping services provided by the plurality of shipping service providers, and compatibility with the international processing provider.

23. The method of claim 20, wherein the selecting the shipping service provider for providing the shipping services of the delivery leg comprises:
  selecting the shipping service provider based at least in part on criteria selected from the group consisting of domestic shipping rates for the plurality of shipping service providers, domestic shipping services provided by the plurality of shipping service providers, and shipping service provider compatible with the international processing provider.

24. The method of claim 20, wherein the selecting the international processing provider for providing the international processing of the item in the bridge leg comprises:
  selecting the international processing provider based at least in part on criteria selected from the group consisting of international processing provider facility locations for the plurality of international processing providers, an attribute of at least one of a shipper of the item or a recipient of the item, an international processing provider compatible with a shipping service provider selected for at least one of the ingestion leg or the delivery leg.

25. The method of claim 20, wherein the selecting the international processing facility for providing the international processing of the item in the bridge leg comprises:
  selecting the international processing provider facility based at least in part on criteria selected from the group consisting of a proximity to a shipper of the item, a proximity to a recipient of the item, suitability for egress from the origination country to the destination country, and suitability of ingress into the destination country from the origination country.

26. The method of claim 20, the method further comprising:
  manipulating, by the international shipment computer system, the tracking information provided for the item for the second tracking number, wherein manipulating comprises changing information from status data of the tracking information obtained using the second tracking number that corresponds to and is accurate for the delivery leg to status data that is accurate in the context of the multiple leg international shipment rather than domestic shipment of the item.

27. A system comprising:
  a unified tracking number database configured to store a unified tracking number corresponding to a multiple leg international shipment for an item, wherein the unified tracking number is stored in association with a first tracking number associated with an ingestion leg of the multiple leg international shipment and a second tracking number associated with a delivery leg of the multiple leg international shipment; and an international shipment computer system coupled to a shipper computer system and an international processing provider computer system, wherein the international shipment computer system is configured to:

receive an international shipping request for the item, wherein the international shipping request includes product data associated with the item received via a sales transaction computer system;

generate, based on the product data received via the sales transaction computer system, international processing information, wherein the international shipment computer system configured to generate the international processing information further comprises the international shipment computer system configured to:

associate the product data with customs goods codes stored in a database, wherein the international processing information comprises customs, duty, and tax information, and wherein the international shipment computer system configured to associate the product data with customs goods codes stored in the database further comprises the international shipment computer system configured to:

correlate the product data with a generic listing or sales categories for goods codes stored in the database, and identify one or more of the customs goods codes corresponding to the item;

provide the international processing information to the international processing provider computer system to facilitate international processing of the item prior to arrival of the item at a destination country;

select, in response to receiving the international shipping request, a shipping service provider for providing domestic shipping services in an origination country from a plurality of shipping service providers providing domestic shipping services in the origination country, wherein the selected origination country shipping service provider provides domestic shipping services for the ingestion leg of the multiple leg international shipment of the item, wherein the shipping services of the ingestion leg transport the item within the origination country to an international processing provider for international processing of the item, wherein the international processing of the item is facilitated by transmission of the international processing information to the international processing provider computer system prior to arrival of the item at the destination country, and wherein tracking information for the item corresponding to the first tracking number is stored by a first shipping service provider computer system associated with the selected origination country shipping service provider, select, in response to receiving the international shipping request, a shipping service provider for providing domestic shipping services in a destination country from a plurality of shipping service providers providing domestic shipping services in the destination country, wherein the selected destination country shipping service provider provides domestic shipping services for a delivery leg of the multiple leg international shipment of the item, wherein the shipping services of the delivery leg transport the item within the destination country a recipient location after the international processing of the item, wherein the delivery leg of the multiple leg international shipment has a second tracking number associated therewith, and wherein tracking information for the item corresponding to the second tracking number is stored by a second shipping service provider computer system associated with the selected destination country shipping service provider, select, in response to receiving the international shipping request, at least one of an international processing provider or an international processing provider facility for providing international processing of the item from a plurality of international processing providers or a plurality of international processing provider facilities, wherein the international processing provides a bridge leg of the multiple leg international shipment, and wherein the bridge leg provides international transport of the item, control, via the coupled shipper computer system, generation of an origination country domestic shipping label for use in the ingestion leg of the multiple leg international shipment of the item, wherein the origination country domestic shipping label is associated with the first tracking number, control, via the coupled international processing provider computer system, generation of a destination country domestic shipping label for use in a delivery leg of the multiple leg international shipment of the item, wherein the destination country domestic shipping label is associated with the second tracking number, assign the unified tracking number stored by the unified tracking number database to correspond to the multiple leg international shipment of the item, obtain tracking information for the item using at least one of the first tracking number or the second tracking number for a respective individual shipment leg of the multiple leg international shipment, manipulate tracking information provided for the item based on the at least one of the first tracking number or the second tracking number for the respective individual shipment leg of the multiple leg international shipment, wherein the manipulation comprises changing status data of the tracking information obtained using the at least one first tracking number or the second tracking number that corresponds to and is accurate for domestic shipment of the item reported for the respective individual shipment leg to status data accurate in a context of the multiple leg international shipment, and report a tracking status of the item by accessing the changed tracking information and presenting tracking status information that is accurate in the context of the multiple leg international shipment using the unified tracking number.

28. The system of claim 27, further comprising:
a printer coupled to the international processing provider computer system and operable to print the destination country domestic shipping label.

29. The system of claim 28, further comprising:
a printer coupled to the shipper computer system and operable to print the origination country domestic shipping label.

30. The system of claim 27, wherein the international shipping request is received in association with a sales transaction for the item, wherein the international shipment computer system is coupled to a sales transaction computer system used in the sales transaction and obtains information regarding the item for the international processing.

31. The system of claim 30, wherein the information includes information used in clearing the item through customs in the destination country.

32. The system of claim 30, wherein the international shipment computer system is configured to provide international duty information to the sales transaction computer system for collecting international duty payment during the sales transaction.

33. The system of claim 27, wherein the bridge leg of the multiple leg international shipment does not have a tracking number associated therewith, and wherein the international shipment computer is configured to present unified tracking information that is accurate to the multiple leg international shipment throughout the bridge leg where tracking information for the bridge leg is not available.

* * * * *